United States Patent
Yang et al.

(10) Patent No.: US 10,324,329 B2
(45) Date of Patent: Jun. 18, 2019

(54) DISPLAY DEVICE

(71) Applicant: LG DISPLAY CO., LTD., Seoul (KR)

(72) Inventors: SangMo Yang, Paju-si (KR); JongTak Aeo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/786,992

(22) Filed: Oct. 18, 2017

(65) Prior Publication Data

US 2018/0120633 A1 May 3, 2018

(30) Foreign Application Priority Data

Oct. 31, 2016 (KR) .......................... 10-2016-0143817

(51) Int. Cl.
| | | |
|---|---|---|
| G02F 1/1333 | (2006.01) | |
| G02F 1/1335 | (2006.01) | |
| F21V 8/00 | (2006.01) | |
| G02F 1/13357 | (2006.01) | |

(52) U.S. Cl.
CPC ..... *G02F 1/133524* (2013.01); *G02B 6/0016* (2013.01); *G02B 6/0083* (2013.01); *G02B 6/0088* (2013.01); *G02B 6/0093* (2013.01); *G02F 1/1336* (2013.01); *G02F 1/133308* (2013.01); *G02F 1/133602* (2013.01); *G02B 6/0031* (2013.01); *G02F 2001/133314* (2013.01); *G02F 2201/465* (2013.01); *G02F 2201/503* (2013.01); *G02F 2201/54* (2013.01)

(58) Field of Classification Search
CPC ................ G02B 6/0016; G02B 6/0031; G02F 1/133602; G02F 1/133524; G02F 1/133615; G02F 2001/133322; G02F 2001/133317; G02F 2001/133314
See application file for complete search history.

(56) References Cited

U.S. PATENT DOCUMENTS

| | | | |
|---|---|---|---|
| 2010/0188597 A1 | 7/2010 | Koike et al. | |
| 2010/0328966 A1 | 12/2010 | Shin | |

(Continued)

FOREIGN PATENT DOCUMENTS

| | | |
|---|---|---|
| CN | 102566098 A | 7/2012 |
| TW | 200710491 A1 | 3/2007 |

(Continued)

OTHER PUBLICATIONS

Office Action dated Apr. 23, 2018 from the Taiwan Patent Office in counterpart Taiwanese Application No. 106136772.

(Continued)

*Primary Examiner* — James A Dudek
(74) *Attorney, Agent, or Firm* — Morgan, Lewis & Bockius LLP

(57) ABSTRACT

A display device includes a display panel; a light guide plate configured to provide light to a rear side of the display panel; a cover bottom including a rear portion configured to cover a rear surface of the light guide plate, and a side portion bent toward the display panel from an end portion of the rear portion; and a support coupled to the cover bottom and configured to position the light guide plate and to accommodate longitudinal expansion of the light guide plate, the support being provided at a position adjacent to a longitudinal end portion of the light guide plate.

13 Claims, 7 Drawing Sheets

(56) References Cited

U.S. PATENT DOCUMENTS

| | | | |
|---|---|---|---|
| 2011/0149200 A1* | 6/2011 | Joo | G02F 1/133308 349/61 |
| 2012/0162880 A1 | 6/2012 | Yoon et al. | |
| 2013/0070475 A1* | 3/2013 | Youk | G02B 5/0242 362/602 |
| 2013/0077343 A1 | 3/2013 | Kim et al. | |
| 2013/0308074 A1 | 11/2013 | Park et al. | |
| 2013/0335668 A1* | 12/2013 | Tang | G02F 1/133308 349/58 |
| 2015/0062969 A1 | 3/2015 | Chen et al. | |
| 2015/0241731 A1* | 8/2015 | Jeong | G02B 6/009 349/58 |
| 2016/0116661 A1 | 4/2016 | Kobayashi | |
| 2016/0192512 A1 | 6/2016 | Fujii et al. | |

FOREIGN PATENT DOCUMENTS

| | | |
|---|---|---|
| TW | 201510617 A | 3/2015 |
| WO | 2012/077562 A1 | 6/2012 |

OTHER PUBLICATIONS

Communication dated Apr. 11, 2018 from the European Patent Office in counterpart EP Application No. 17198296.0.

Extended European Search Report issued in European Application No. 17198296.0 dated Oct. 24, 2018.

Office Action dated Sep. 27, 2018 from the Taiwan Patent Office in counterpart Taiwanese Application No. 106136772.

* cited by examiner

DISPLAY DEVICE

This application claims priority from Korean Patent Application No. 10-2016-0143817, filed on Oct. 31, 2016, which is hereby incorporated by reference for all purposes as if fully set forth herein.

BACKGROUND

Technical Field

Embodiments of the present disclosure relate to a display device and, more particularly, to a display device having a display panel and a light guide plate.

Description of the Related Art

For use as flat panel display devices, a liquid crystal display device, a plasma display device, a field emission display device, an organic light emitting display device, and the like have been developed. However, the liquid crystal display device and the organic light emitting display device have been in the spotlight in recent years due to advantages of mass production technology, ease in driving, and high image quality.

FIG. 1 is an exploded perspective view illustrating a structure of a general liquid crystal display device.

As illustrated in FIG. 1, a general liquid crystal display device includes a liquid crystal panel 10 in which pixels are arranged in a matrix form so as to output an image, drivers 15 and 16 for driving the pixels, a backlight unit provided on the rear surface of the liquid crystal panel 10 to emit light over the entire surface of the liquid crystal panel 10, and a panel guide 45 that fixedly receives the liquid crystal panel 10 and the backlight unit.

The liquid crystal panel 10 includes a color filter substrate and an array substrate bonded together so as to maintain a uniform cell gap, and a liquid crystal layer formed in a cell gap between the color filter substrate and the array substrate.

A common electrode and a pixel electrode are formed on the liquid crystal panel 10 in which the color filter substrate and the array substrate are bonded to each other so as to apply an electric field to the liquid crystal layer. When a voltage of a data signal is applied to the pixel electrode in a state in which a voltage is applied to the common electrode, the liquid crystal of the liquid crystal layer rotates due to dielectric anisotropy according to the electric field between the common electrode and the pixel electrode so that light is transmitted through or blocked by each pixel to display a character or an image.

In addition, to control the voltage of the data signal applied to the pixel electrode for each pixel, a switching element, such as a thin film transistor (TFT), is individually provided in each pixel.

Upper and lower polarization plates (not illustrated) are attached to the outside of the liquid crystal panel 10 in which the lower polarization plate polarizes the light that passes through the backlight unit and the upper polarization plate polarizes the light that passes through the liquid crystal panel 10.

In describing the backlight unit with more detail, a light emitting diode (LED) assembly 30 for emitting light is provided on one side of a light guide plate 42, and a reflector 41 is provided on the rear surface of the light guide plate 42. In this case, the LED assembly 30 includes an LED array 31 and an LED housing 32 to which an LED Printed Circuit Board (PCB) (not illustrated) that drives the LED array 31 is attached. The light emitted from the LED array 31 is incident on the side surface of the transparent light guide plate 42 that is made of a transparent material, and the reflector 41 disposed on the rear surface of the light guide plate 42 guides the light transmitted through the back surface of the light guide plate 42 toward an optical sheet 43 on the top surface of the light guide plate 42 to reduce light loss and to improve uniformity.

On the upper side of the backlight unit configured as described above, a liquid crystal panel 10 constituted with a color filter substrate and an array substrate is seated via a panel guide 45. The liquid crystal panel 10 and the panel guide 45 are coupled to the backlight unit by a cover bottom 50 and a top case 60 to form a liquid crystal display device.

However, a related art display device as described has a problem in that, when the light guide plate is thermally expanded, the light guide plate may be subjected to deformation that causes scratching or distortion, or subjected to breakage that causes cracks in the light guide plate. Thus, a defective image may be caused in the display device.

In addition, the related art display device has a problem in that a material cost and the number of manufacturing steps increase due to an assembly structure in which the cover bottom and the top case in which the liquid crystal panel and the light guide plate are built are coupled to each other by separate fastening members.

Accordingly, there is a growing need for developing a display device that is capable of reducing the material cost and the number of the manufacturing steps of the display device while preventing the light guide plate from being subjected to deformation that causes scratching or distortion, or to breakage that causes cracks when the light guide plate is thermally expanded due to heat generated during the operation of the display device.

SUMMARY

Accordingly, embodiments of the present disclosure are directed to a display device that substantially obviates one or more of the problems due to limitations and disadvantages of the related art.

An object of the the present invention is to provide a display device that is capable of preventing deformation that causes scratching or distortion, or breakage that causes cracks in the light guide plate when the light guide plate is thermally expanded, thereby preventing a defective image in a display device.

Another object of the present invention is to provide a display device in which a supporting member that supports the light guide plate has a structure capable of being coupled to the cover bottom, the top case, and the like in the display device such that a material cost and the number of manufacturing processes can be reduced, and the assembly of the display device can be simplified.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a display device comprises a display panel; a light guide plate configured to provide light to a rear side of the display panel; a cover bottom including a rear portion configured to cover a rear surface of the light guide plate, and a side portion bent toward the display panel from an end portion of the rear portion; and a support coupled to the cover bottom and configured to position the light guide plate and to accommodate longitudinal expansion of the light guide plate, the support being provided at a position adjacent to a longitudinal end portion of the light guide plate.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Figure 1:
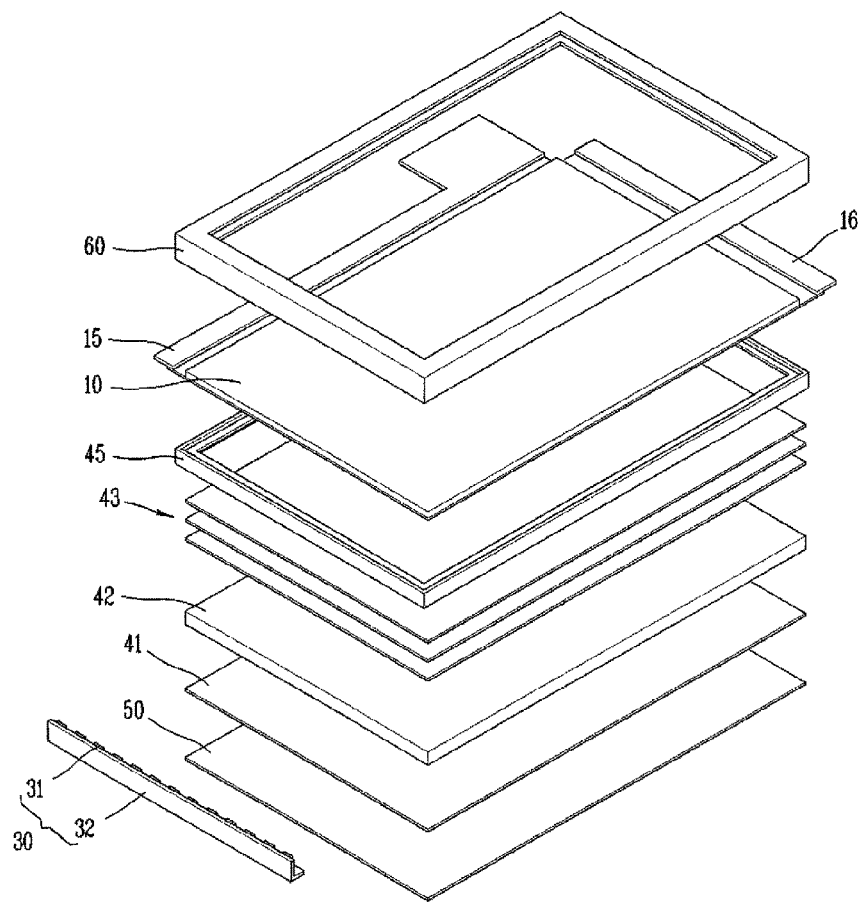
FIG. 1 is an exploded perspective view illustrating a structure of a general liquid crystal display device.

Hereinafter, embodiments will be described with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to," "is coupled to," or "is in contact with" another structural element, it should be interpreted that another structural element may "be connected to," "be coupled to," or "be in contact with" the structural elements as well as that the certain structural element is directly connected to or is in direct contact with another structural element.

Figure 2:
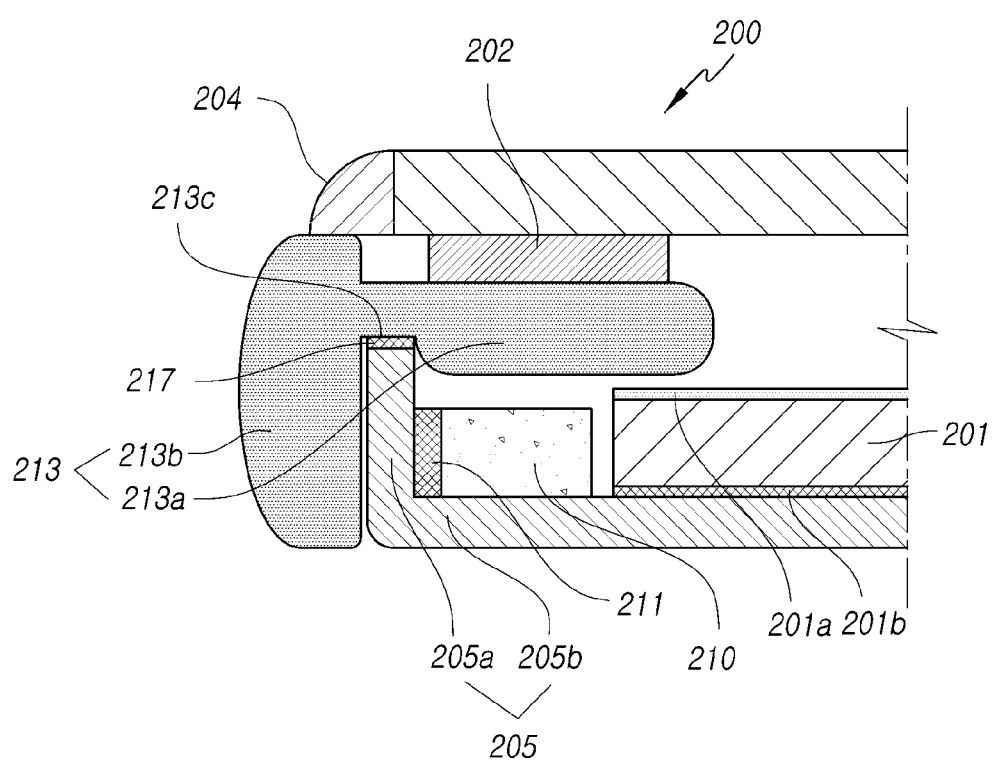
FIGS. 2 and 3 are cross-sectional views illustrating a display device according to example embodiments disclosed herein.
Figure 3:
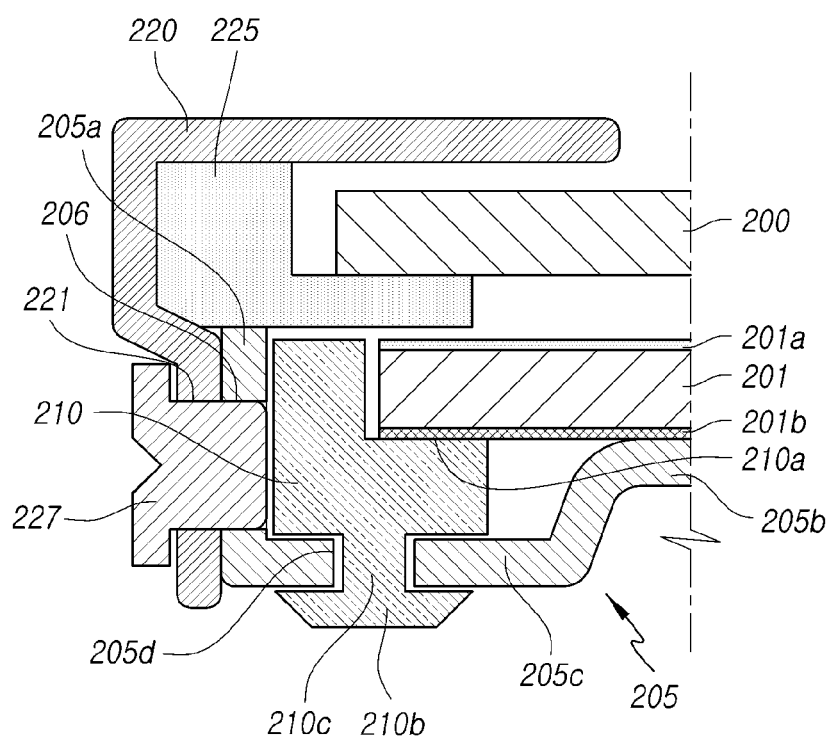
Figure 4:
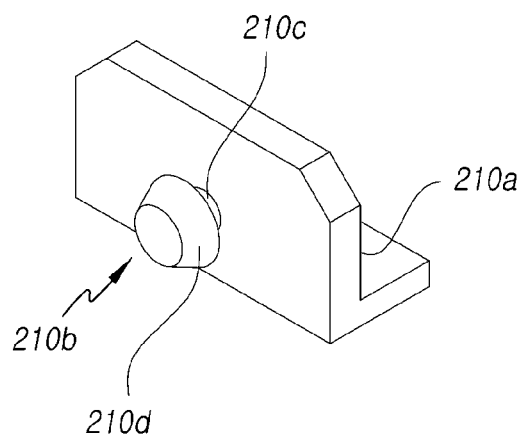
FIGS. 4 to 6 are perspective views illustrating a support member in the display device according to the example embodiments.
Figure 5:
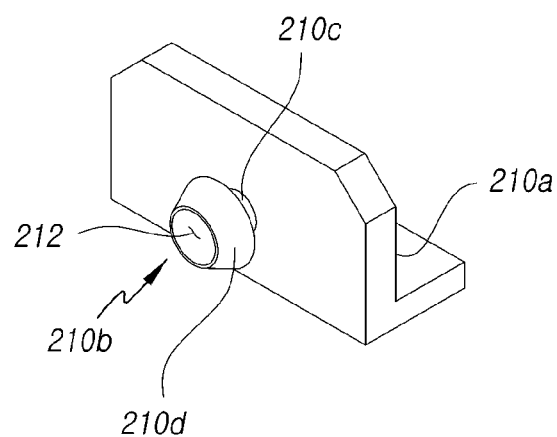
Figure 6:
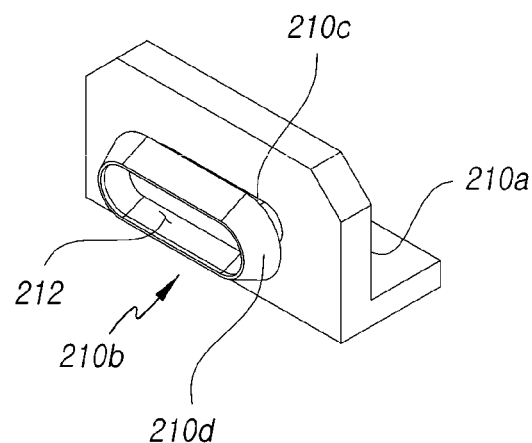
Figure 7:
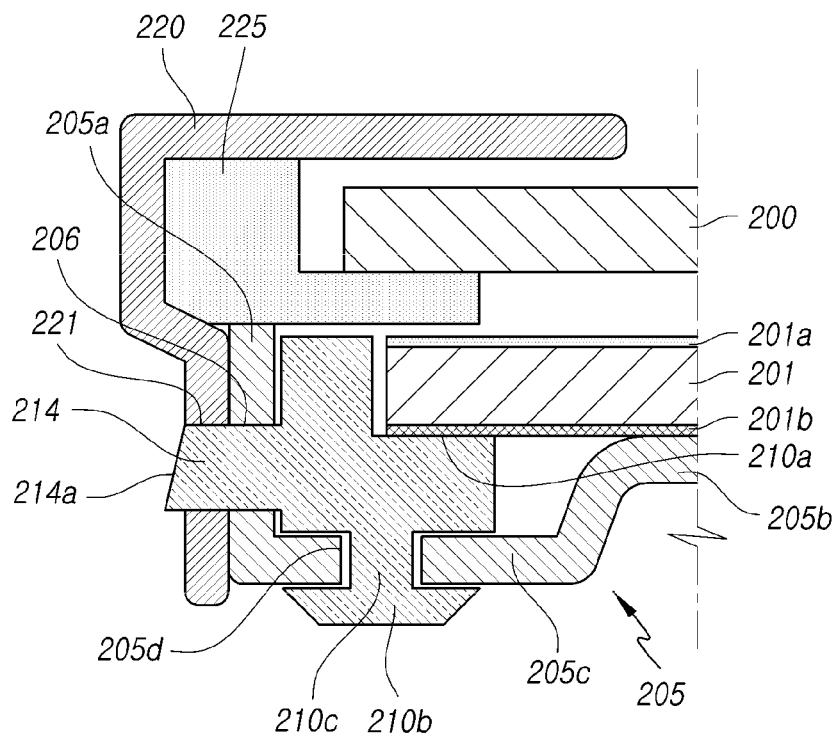
FIG. 7 is a cross-sectional view illustrating a display device according to example embodiments disclosed herein.

FIGS. 2 and 3 are cross-sectional views illustrating a display device according to example embodiments disclosed herein, FIGS. 4 to 6 are perspective views illustrating a support member in the display device according to the example embodiments, and FIG. 7 is a cross-sectional view illustrating a display device according to example embodiments disclosed herein.

As illustrated in these drawings, a display device may include a light guide plate 201 provided on the rear side of a display panel 200; a cover bottom 205 including a rear portion 205b configured to support the rear surface of the light guide plate 201 and a side portion 205a bent toward the display panel 200 at an end portion of the the rear side portion 205b; and a support member 210 configured to support longitudinal expansion of the light guide plate 201 at a position spaced apart from the end portion of the light guide plate 205 in a longitudinal direction and coupled to the light guide plate 201.

First, with reference to FIG. 2, in the display device according to the example embodiments, the display panel 200, an optical sheet 201a, and the like are disposed on the front side of the light guide plate 201, and a reflector 201b and the cover bottom 205 and the like are disposed on the rear side of the light guide plate 201. In addition, because the support member 210 configured to support the longitudinal expansion of the light guide plate 201 is coupled to the cover bottom 205 at the end side of the light guide plate 201, it is possible to prevent the light guide plate 201 from being subjected to deformation that causes scratching or distortion, or subjected to breakage that causes cracks during the thermal expansion of the light guide plate 201. As a result, a defective image can be prevented.

Here, example embodiments will be described with reference to a case where a display panel is a liquid crystal display panel. If the display panel is a liquid crystal display panel, the display panel may include case members configured to assemble a backlight unit, a driving circuit unit, a liquid crystal display panel, a backlight unit, and the like into one module, and the driving circuit unit may include a control unit, such as a data driving circuit (source driving circuit), a gate driving circuit (scan driving circuit), a timing controller, and a printed circuit board. Also, in the liquid crystal display panel, a liquid crystal layer may exist between an upper substrate and a lower substrate, in which the upper substrate may be a color filter substrate corresponding to a viewing screen unit, and the lower substrate may be a thin film transistor substrate.

In addition, on any one end portion of the display panel formed in a rectangular shape, a plurality of flexible circuit films, on which ICs are mounted, are electrically connected to the display panel, and a printed circuit board is mounted to be parallel to the display panel. Further, the plurality of flexible circuit films are attached to pad portions and the printed circuit board by a tape automated bonding (TAB) process, and may be formed of a tape carrier package (TCP), or a chip on flexible board or chip on film (COF).

Accordingly, the display panel may be electrically joined or connected to a source printed circuit board through the plurality of flexible circuit films, and the source printed circuit board, which is covered and protected by the cover bottom, is electrically connected to the plurality of flexible circuit films to provide various signals for displaying an image on the display panel to a timing controller.

In the liquid crystal display panel, the backlight unit may include an LED, an LED printed circuit board, a light guide plate 201, a reflector 201b, an optical sheet 201a, and the like in order to supply light to the display panel, and may be implemented as a direct-type or an edge-type depending on a mounting position of the LED. In the example embodiments, the light guide plate 201 is provided on the rear side of the display panel 200 and the cover bottom 205 is provided on the back side of the light guide plate 201. The cover bottom 205 is provided with a side portion 205a bent toward the display panel 200 and a rear portion 205b configured to support the rear surface of the light guide plate 201 so that the light guide plate 201 is seated on the cover bottom 205.

In addition, a support member 210 may be coupled to the support member 210, which supports the longitudinal expansion of the light guide plate 201, at a position spaced apart from the end portion of the light guide plate 201 in the longitudinal direction. The light guide plate 201 may be made of a polymer resin, such as methacrylate styrene (MS) which is a light transmitting material so that light can be transmitted therethrough. Therefore, the inner surface of the support member 210 and the end portion of the light guide plate 210 are disposed to be spaced apart from each other so as to prevent bending, deformation, breakage, or the like from being caused by thermal expansion.

Here, the support member 210 may be made of an elastic material, such as rubber, silicone, or urethane, to absorb a longitudinal expansion amount of the light guide plate 201, and is bonded to the side portion 205a of the cover bottom 205 through an adhesive member 211 or an adhesive so that the support member 210 can be elastically deformed in position without being pushed or released upon being in contact with the light guide plate 201 due to the thermal expansion of the light guide plate 201. Here, as the bonding member 211, a foam pad, urethane, or rubber that is provided with an adhesive layer on each side, a double-sided tape, or the like may be used.

In the embodiments, a panel support member 213 may be further included to support the display panel 200. The panel support member 213 may include a seating portion 213a on which the rear surface of the display panel 200 is seated and supported, and an outer portion 213a that is vertically connected to the seating portion 213a and is located outside the side portion 205a of the cover bottom 205. When the panel support member 213 is provided, the panel support member 213 is capable of supporting the display panel 200 as well as the outer side of the cover bottom 205 so that the coupling and rigidity of the entire display device can be maintained.

Here, the panel support member 213 may be formed of a plastic material or a metal material. However, in consideration of the appearance of the display device in addition to a predetermined level of strength, the panel support member 213 may be formed of aluminum, an aluminum alloy, stainless steel, a galvanized steel sheet, or the like.

In addition, the display panel 200 may be coupled to the seating portion 213a of the panel support member 213 with an adhesive member 202 or an adhesive interposed therebetween. Here, as the bonding member 202, a foam pad, urethane, or rubber that is provided with an adhesive layer on each of the opposite sides thereof, a double-sided tape, or the like may be used.

Further, an insertion portion 213c may provided between the outer portion 213b and the seating portion 213a to be recessed such that the side portion 205a of the cover bottom 205 is inserted into the insertion portion 213 to be coupled in position, and the end portion of the side portion 205a is supported and coupled via the adhesive member 217.

Also, a damping member 204 may be provided between the end portion of the display panel 200 and the front surface of the outer portion 213b of the panel support member 213 in order to absorb an impact. If the damping member 204 is provided, even though an impact is applied from the outside, it is possible to prevent the breakage of the end portion of the display panel 200 and the infiltration of moisture and foreign matter from the outside. Here, the damping member 204 may include a foam pad, urethane, rubber or the like that includes an adhesive layer on a surface and is attached to the display panel 200 and the outer portion 213b of the cover bottom 205, or may be coated with an elastic resin or the like.

Meanwhile, as illustrated in FIG. 3, the support member 210 may include a support groove 210a in which the end portion of the light guide plate 201 is seated, and a protruding end portion 210b and 210c protruding toward the rear portion 205b of the cover bottom 205 and inserted into the a fastening hole of the rear portion 205b of the cover bottom 205 so that the support member 210 can be detachably coupled to the cover bottom 205. That is, the support groove 210a may be formed by cutting a portion of the side surface of the support member 210 which is opposed to the end portion of the light guide plate 201 so that the light guide plate 201 is seated and supported at a position spaced apart from the end portion of the light guide plate 201, and the protruding end portion 210b and 210c may be provided on the bottom surface of the support member 210 to be detachably coupled to the cover bottom 205.

As illustrated in FIG. 2, the support member 210 may be coupled to the cover bottom 205 with the adhesive member 211. However, as illustrated in FIG. 3, when the support member 210 on which the light guide plate 201 is mounted is detachably coupled to the cover bottom 205. By being detachably coupled to the bottom 205, assembly is simplified and disassembly is also be simplified at the time of reworking so that the convenience at the time of reworking can be increased while reducing the assembly cost and the number of processes.

On the rear portion 205b of the cover bottom 205, a stepped portion 205c may be provided to be stepped to be parallel to and spaced apart from the light guide plate 201. The stepped portion 205c is provided with a fastening hole 205d to be be coupled with the protruding end portion 210b and 210c of the support member 210. By providing the stepped portion 205c on the rear portion 205b of the cover bottom 205 in this manner, it is possible to secure a space to be coupled with the cover bottom 205 while supporting the light guide plate 201 by the support member 210, and to increase the rigidity of the cover bottom 205 in the stepped portion 205c so that deformation of the rear portion 205b of the cover bottom 205 can be prevented at the time of assembly and disassembly of the support member 210.

The protruding end portion 210b and 210c is provided with a support end portion 210b that protrudes in a radial direction to be larger than the inner diameter of the coupling hole 205d to prevent the protruding end portion from being easily separated from the coupling hole 205d after being coupled thereto. That is, the protruding end portion 210b and 210c protruding from the bottom surface of the support member 210 include a support end portion 210b and a small diameter portion 210c. Because the small diameter portion 210c having a reduced diameter is provided between the support member 210 body and the support end portion 210b, the support end portion 210b passes through the fastening hole 205d while being resiliently compressively deformed at the time of being coupled to the fastening hole 205d such that the support member 210 is supported at the outside of the fastening hole 205d and the small diameter portion 210c is inserted into and supported by the fastening hole 205d.

Meanwhile, as illustrated in FIGS. 4 to 6, the support end portion 210b may have a cylindrical column shape, an elliptical column shape, or a polygonal column shape, and may include an inclined tapered surface 210d in the circumferential outer surface thereof to be easily coupled with the fastening hole 205d at the time of coupling and to be prevented from being separated from the fastening hole 205d. A hollow portion 212 may be formed inside the support end portion 210b as an empty space. As the hollow portion 212 may be provided inside the support end portion 210b as illustrated in FIGS. 5 and 6, the support end portion 210b is elastically shrunk and deformed more easily than that in the case where the hollow portion 212 is not provided as illustrated in FIG. 4 so that the coupling can be more easily coupled to the fastening hole 205d at the time of being coupled to the fastening hole 205d and can be prevented from being separated from the fastening hole 205d.

In addition, as illustrated in FIGS. 3 and 7, a top case 220 may be provided outside the side portion 205a of the cover bottom 205, and a panel guide 225 may be provided to support the display panel 200. In this case, the top case 220 and the cover bottom 205 may be coupled to each other through a fastening member 227 as illustrated in FIG. 3, or through the support member 210 as illustrated in FIG. 7. That is, as shown in FIG. 3, a top case 220 having a first fixing hole 221 may be provided on the outer side of the side portion 205a, a second fixing hole 206 may be provided in the side portion 205a at a position corresponding to the first fixing hole 221, and a fastening member 227 may be coupled to the first fixing hole 221 and the second fixing hole 206.

In such a case, the top case 220 is seated in the direction in which the first fixing hole 221 and the second fixing hole 206 are coaxially superimposed on each other in the outer side of the side portion 205a. Then the fastening member 227 is fastened and assembled by an operator so that the top case 220 can be firmly coupled due to the fastening force of the fastening member 227.

In addition, in the example embodiment illustrated in FIG. 7, a top case 220 having a first fixing hole 221 may be provided outside the side portion 205a, a second fixing hole 206 may be provided in the side portion 205a at a position corresponding to the first fixing hole 221, and a fixing protrusion 214 to be inserted into the first fixing hole 221 and the second fixing hole 206 may be provided on a side surface of the support member 210, so that the top case can be coupled through the fixing protrusion 214. In this case, while the top case 220 is being slid in the direction parallel to the outer surface of the side portion 205a, e.g., in the vertical direction in FIG. 7, the fixing protrusion 214, which is inserted into the second fixing hole 206 to protrude outward, is inserted into the first fixing hole 221 of the top case 220 so that the top case 220 can be assembled without a separate fastening member.

In addition, to facilitate coupling at the time of vertical sliding assembly of the top case 220, an inclined tapered surface 214a is provided on the outer surface of the fixing protrusion 214 so that the coupling can be facilitated at the time of coupling the top case 220 and the cover bottom 205 to each other, and separation can be prevented. That is, the tapered surface 214a of the fixing protrusion 214 may be formed to be inclined such that the outward protrusion amount of the fixing protrusion 214 gradually increases in the direction in which the top case 220 is slid downward, e.g., from the upper side to the lower side in the drawing so that the coupling can be facilitated at the time of coupling the top case 220 and the cover bottom 205 to each other, and separation can be prevented.

As described above, according to the embodiments disclosed here, in a display device, it is possible to prevent deformation that causes scratching or distortion, or breakage that causes cracks in the light guide plate when the light guide plate is thermally expanded, and as a result, to prevent a defective image in the display device.

In addition, according to the embodiments, a display device is provided with a supporting member that supports the light guide plate having a structure capable of being coupled to the cover bottom, the top case, and the like so that a material cost and the number of manufacturing processes can be reduced, and the assembly of the display device can be simplified.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

In addition, because terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:
   a display panel;
   a light guide plate configured to provide light to a rear side of the display panel;
   a cover bottom including a rear portion configured to cover a rear surface of the light guide plate, and a side portion bent toward the display panel from an end portion of the rear portion;
   a support coupled to the cover bottom and configured to position the light guide plate and to accommodate longitudinal expansion of the light guide plate, the support being provided at a position adjacent to a longitudinal end portion of the light guide plate;
   a top case provided outside the side portion and including a first fixing hole, wherein the side portion includes a second fixing hole at a position corresponding to the first fixing hole; and
   a fixing protrusion provided on a side surface of the support to be inserted into the first fixing hole and the second fixing hole,
   wherein the fixing protrusion is a part of the support.

2. The display device of claim 1, wherein the support is coupled to the side portion of the cover bottom with an adhesive member or an adhesive interposed therebetween.

3. The display device of claim 2, further comprising a panel support including a seating portion in which a rear surface of the display panel is seated and supported, and an outer portion connected to the seating portion and positioned outside the side portion.

4. The display device of claim 3, further comprising a damping member provided between an end portion of the display panel and an outer front surface of the panel support to absorb an impact.

5. The display device of claim 1, wherein the support includes a support groove in which the end portion of the light guide plate is seated, and a protruding end portion protruding toward the rear surface of the cover bottom and inserted into a fastening hole of the rear portion.

6. The display device of claim 5, wherein the rear portion includes a stepped portion that is stepped to be parallel to and spaced apart from the light guide plate, and the fastening hole is provided in the stepped portion.

7. The display device of claim 6, wherein the protruding end portion includes a support portion that protrudes radially to be larger than an inner diameter of the fastening hole and to be supported.

8. The display device of claim 7, wherein the support portion includes an inclined tapered surface on a circumferential outer surface thereof, and includes a hollow portion formed inside the support end portion as an empty space.

9. The display device of claim 8, further comprising:
a top case provided outside the side portion and including a first fixing hole, wherein the side portion includes a second fixing hole at a position corresponding to the first fixing hole; and
a fastening member coupled to the first fixing hole and the second fixing hole.

10. The display device of claim 1, wherein an outer surface of the support is supported by the side portion of the cover bottom.

11. A display device, comprising:
a display panel;
a light guide plate configured to provide light to a rear side of the display panel;
a cover bottom including a rear portion configured to cover a rear surface of the light guide plate, and a side portion bent toward the display panel from an end portion of the rear portion; and
a support coupled to the cover bottom and configured to position the light guide plate and to accommodate longitudinal expansion of the light guide plate, the support being provided at a position adjacent to a longitudinal end portion of the light guide plate,
wherein the support includes a support groove in which the end portion of the light guide plate is seated, and a protruding end protruding toward the rear surface of the cover bottom and inserted into a fastening hole of the rear portion,
wherein the rear portion includes a stepped portion that is stepped to be parallel to and spaced apart from the light guide plate, and the fastening hole is provided in the stepped portion,
wherein the protruding end portion includes a support portion that protrudes radially to be larger than an inner diameter of the fastening hole and to be supported, and
wherein the support portion includes an inclined tapered surface on a circumferential outer surface thereof, and includes a hollow portion formed inside the support end portion as an empty space.

12. The display device of claim 11, further comprising:
a top case provided outside the side portion and including a first fixing hole, wherein the side portion includes a second fixing hole at a position corresponding to the fixing hole; and
a fastening member coupled to the first fixing hole and the second fixing hole.

13. The display device of claim 11, further comprising:
a top case provided outside the side portion and including a first fixing hole, wherein the side portion includes a second fixing hole at a position corresponding to the first fixing hole; and
a fixing protrusion provided on a side surface of the support to be inserted into the first fixing hole and the second fixing hole.

* * * * *